March 7, 1961 H. JAEGER 2,973,620
THERMALLY ACTUATED CONTROL APPARATUS
Filed July 21, 1958
Fig. 1
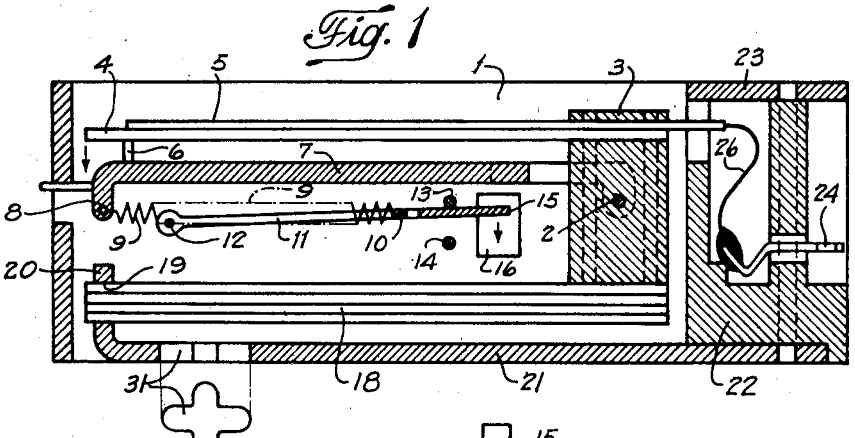
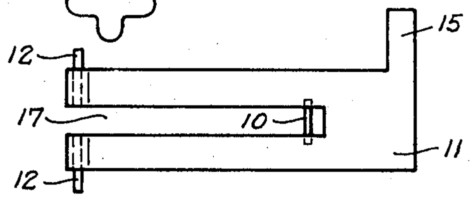
Fig. 2
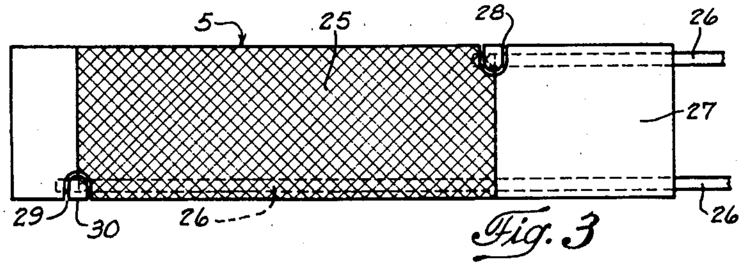
Fig. 3
Fig. 5
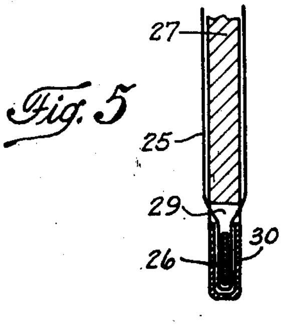
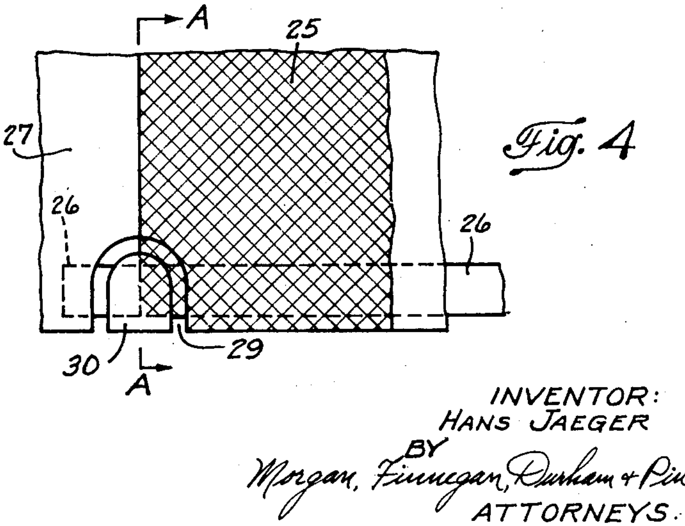
Fig. 4
INVENTOR:
HANS JAEGER
BY
Morgan, Finnegan, Durham & Pine
ATTORNEYS.

United States Patent Office 2,973,620

Patented Mar. 7, 1961

1

2,973,620

THERMALLY ACTUATED CONTROL APPARATUS

Hans Jaeger, Zug, Switzerland, assignor to Landis & Gyr A.G., Zug, Switzerland, a corporation of Switzerland Filed July 21, 1958, Ser. No. 749,869

Claims priority, application Switzerland July 26, 1957

11 Claims. (Cl. 60—23)

This invention relates to thermally actuated control apparatus and more particularly to thermally actuated control apparatus which is compensated for ambient temperature effects.

To control a switching device, electromagnets are often used which actuate the switching device after receiving a control signal. This is the case, for example, with dual tariff computers for electricity meters in which tariff switching is effected by operating a coupling between the measuring system and the computer in question.

However, such electromagnets require much material, are therefore relatively heavy and take up a comparatively large space. In addition, their magnetic field is liable to interfere with the operation of the appliance in which they are housed and they may themselves be affected by outside magnetic fields, thus presenting the danger of making switching for dishonest motives possible. Further, such electromagnets cause humming which is particularly irritating in private dwellings.

It is known to replace the electromagnets with thermal regulators for actuating such switching operations. These regulators generally comprise a bimetallic control which flexes when heated by a heating element and thereby performs mechanical work for actuating the switching operation. Usually, such thermal regulators are equipped with means for compensating the effect caused by varying room temperatures on the bimetallic control and thus on the instance and duration of the switching operation.

In the switching device of a known dual tariff computer, the bimetallic control is, for example, wound in a spiral and is heated by a resistance which surrounds the bimetallic control and which can be periodically connected to the mains. The bimetallic control is coupled by a bell crank to a control shaft which carries a pawl for locking or releasing each of the two computers so that the rotation of the measuring system is transmitted to one or the other computer, depending on the tariff in operation. To compensate for room temperature, a bimetallic compensator is used which is identical to the bimetallic control. In this case, compensation is effected in that the torque exerted by the bimetallic control through the bell crank on the control shaft is balanced by an equal but opposite torque exerted by the bimetallic compensator on the control shaft. Compensation for room temperature thus takes place by forces. Such an arrangement, however, takes up a comparatively large space. It has another disadvantage in that the bimetallic control must overcome relatively high friction in the bearings of the switching device and that each flexure of the bimetallic control is counteracted by the bimetallic compensator, so that, in view of the already low efficiency of such thermoelectric means, the bimetallic control must be intensely heated to actuate the switching operation. It is not possible to decrease the force required from the bimetallic control for the switching operation by altering the compensating means, such as by making the bimetallic compensator weaker, because compensation would thereby be made completely ineffective.

The minimum heat output required for the switching operation in this construction, is thus comparatively high—this being particularly detrimental if the low or high tariff should be maintained for some considerable time. In this case the power consumption for heating the bimetallic control is no longer insignificant. It is a further disadvantage that, if the heating resistance is embedded in a ceramic material as is usual, then heating varies with time, i.e. it is non-reproducible.

The object of the present invention is to provide a thermal regulator in which the above mentioned disadvantages are avoided. There is provided, in one thermal regulator constructed in accordance with the invention, an insulator pivotally mounted on a shaft and carrying a bimetallic control, which actuates the control operation with its free end and which is heated by a heating element arranged on it; the shaft also carries one end of a room-temperature compensator comprising at least one bimetallic compensator the other end of which is guided in the frame of the regulator.

Other objects and advantages of the invention will be set forth in part hereinafter and in part will be obvious herefrom, or may be learned by practice with the invention, the same being realized and attained by means of the instrumentalities and combinations pointed out in the appended claims.

An example of the invention is shown in the drawing, in which:

Fig. 1 is a longitudinal section through a thermal regulator according to the invention, Fig. 2 is a plan of a part of the regulator of Fig. 1, Fig. 3 shows the heating element for the bimetallic control to a larger scale, Fig. 4 is a detail view of the current connection to the heating coil of the heating element, and Fig. 5 is a cross-section on the line A—A in Fig. 4.

In Fig. 1, 1 designates the wall of the housing for the thermal regulator, in which wall a shaft 2 is rigidly mounted. Rotatably mounted on the shaft 2 there is an insulator 3 which is poorly heat conductive and in which one end of a bimetallic control 4 is seated. The latter is rigidly connected to a heating element 5. The free end of the bimetallic control 4 carries a pin 6. There is also provided a rocking arm 7 which can pivot about the shaft 2 and the free end of which is connected to the pin 6 and thereby to the bimetallic control 4. In an opening 8 in the arm 7 there is suspended one end of a tension spring 9 the other end of which engages a pin 10 of a control lever 11 having a lateral extension 15. The lever 11 is tiltably mounted on two shafts 12—one in the housing wall and the other in the opposite housing wall (not shown). Tilting of the control lever 11 is limited by two stops 13, 14. The extension 15 of the lever 11 (Figs. 1 and 2) which serves to actuate a switching device (not shown), projects through an opening 16 in the wall 1 of the regulator housing. The control lever 11 further comprises a slot 17 (Fig. 2) for receiving or accommodating the tension spring 9. One end of a bimetallic compensator pack 18 is connected to the insulator 3, the other end being guided with little play in an opening 19 in the flanged portion 20 of the base 21 of the housing. The individual bimetallic members of the pack 18 are identical to the bimetallic control member 4. The base 21 of the housing has a recess 31 for a special tool with which the base 21 can be distorted for the purpose of adjusting the pack 18. The base 21 also carries a terminal member 22 of insulating material and a cover 23. Within the terminal member 22 there are soldering lugs 24 connected to a heating coil 25

(Fig. 3) of the element 5 by two conductors 26. The coil 25 consists of very thin oxidized chrome-nickel wire because it is directly connected to the 220 v. mains. It is mounted on a coil-support 27 consisting of several flattened turns of water-repellant insulating paper which can withstand temperatures up to 200° C. without damage. This insulating paper also has the property of softening upon heating, without losing its coherence. Insulating paper made from fine asbestos fibres and silicon lacquer is suitable for this purpose. Such paper also has a high dielectric strength, which is advantageous for the intended purpose. After mounting the coil, the heating element 5 comprising the support 27 and coil 25 is first saturated with silicon lacquer for external insulation, the lacquer adhering to the support 27 through the turns of the heating coil 25, and is then covered with a few turns of insulating paper (not shown), preferably of the same kind as used for the coil-support 27. The completed heating element 5 is thereupon hardened under pressure in a kiln.

The silver-plated copper, flat and thin conductors 26 are located within the coil-support 27 and are connected to the ends of the coil 25 in recesses 28, 29 in the support 27. In this connection, soft soldering is not possible because of the oxide material of the heating coil and hard soldering would destroy the insulation while spot welding is also out of the question because of the danger of melting the thin coil. The coil 25 is therefore joined to the conductors 26 by means of a clamp connection. This clamp connection (Figs. 4 and 5) is brought about by a U-shaped clip 30 which is pushed over the turns of the coil 25 exposed in the recesses 28, 29 and over the conductors 26 and then tightly compressed. Upon compression, the comparatively hard heating wire penetrates into the soft material of the clip 30, resulting in contact areas. Such a connection is better than mere winding of the heating coil over the bared portions of the conductors because it causes no variable contact resistances but insures a permanent contact.

In the unheated state of the thermal regulator, the control lever 11 is held by the spring 9 in a position in which it lies against the stop 13. If, now, the heating element 5 is energized after receiving a control signal such as through a remote control receiver or a time switch, the element 5 heats the bimetallic control 4 which flexes downwardly. As soon as the lefthand end of the spring 9 has been lowered to a position where its axis is coplanar with the plane of the control lever 11, the latter snaps over against the stop 14, whereby the extension 15 effects the desired switching operation. The lever 11 remains in this position for the duration of heating of the bimetallic control 4. If heating is interrupted, the lever 11 snaps back to its starting position after a certain time and thereby effects a switching operation in the opposite direction.

If the thermal regulator is heated or cooled by external influences, so that unintentional flexing of the bimetallic control takes place, the identical bimetallic compensator members 18 are equally heated or cooled and flexed to the same amount and in the same direction as the bimetallic control 4. As a result, flexure of the members 18 causes the insulator 3 to turn so that undesirable flexing of the control 4 is compensated and fails to affect the rocking arm 7 and control lever 11. One end of the compensator pack thereby moves in the guide 19 so that it is not compressed during flexing, which would be the case if it were fixed to the flanged part 20. Temperature compensation is effective over a wide range in this case, for example, from at least −10° to +50° C.

The advantage of using several bimetallic members in the compensator pack 18 instead of a single one, is that the path traversed by the end of the bimetallic control 4 for displacing the control lever 11 can be kept comparatively small and yet have effective compensation for room temperature, this also resulting in a correpondingly small switching time. The force to be exerted by the bimetallic control 4 for displacing the control lever 11 against, say, the stop 14, exerts a clockwise torque on the insulator 3 by means of which the free end of the bimetallic control 4 is moved back again upwardly so that the effective path covered is reduced. Since, however, the torque resisting flexing of the compensator pack 18 is greater than for a single bimetallic compensator, the pack 18 is moved downwardly through only a correspondingly smaller amount by the torque exerted by the insulator 3. Consequently, the insulator 3 likewise turns clockwise through only a correspondingly smaller amount and the result is that the path covered by the free end of the bimetallic control is likewise small.

By having several bimetallic compensator members, compensation for alteration in room temperature is not affected because flexing of the packet 18 is the same as that of the bimetallic control 4 since the sizes are identical. The compensator members 18 do not oppose flexing of the control 4 because room-temperature compensation is here effected by displacement and not by forces as in the known construction hereinbefore described. In that construction, if a plurality of bimetallic compensators were provided, the force exerted by them in opposition to the flexure of the bimetallic control would be correspondingly larger and a greater heat output would thus be required. In addition, by making the compensator in the form of a bimetallic pack, the heat capacity of the latter is correspondingly large, so that the unfavorable heat effect of the heating element 5 on the bimetallic members 18 has very little influence on the switching period. There is thus a further advantage, namely that compensation is fully effective over a wide temperature range. Consequently, the path covered by the free end of the bimetallic control 4 for displacing the control lever 11 can also be kept very small without the fear of an unintentional switching operation taking place as a result of very intense room-temperature fluctuations. In view of the reduction in the path traversed by the free end of the bimetallic control 4, as hereinbefore described, the work required to execute a switching operation is correspondingly small. Further, the work for flexing the heating element itself is kept small in that the insulating paper used for the heating element softens upon heating and, in view of its high dielectric strength, can be so thin that its resistance to flexing is negligibly small. The high dielectric strength of the outer insulation also permits it to be comparatively thin, with the advantage that a good heat transfer exists between the heating element and the bimetallic control. A test has shown that the heat delivered by the heating element to the bimetallic control is larger than that to the air.

The combined effect of the features referred to is a considerable reduction in the required heat output which is particularly important with respect to the power consumption if the thermal regulator must remain connected to the mains for some long period. By using very thin and flat conductors 26 connected, as hereinbefore described, to the heating coil 25 in recesses 28, 29 in the coil-support 27, it is possible to make the heating element very flat. Its arrangement within the coil-support also results in a high mechanical strength. The thermal regulator as described further has the advantage that it can be connected directly to the 220 v. mains without any intermediate voltage transformers or resistances. Moreover, the dielectric strength between the start and end of the heating coil and its mechanical strength are very high and, for a thermal regulator having a heating element made of a total of six turns of 0.11 mm. insulating paper, its strength is about 16 kv.

The thermal regulator as described is particularly suitable for tariff switch-overs in multi-tariff meters because in that case the bimetallic operator often has to be heated for prolonged periods to maintain a particular tariff and because it is thus possible to keep the power consumption of the heating element to a minimum. The regulator could also, for example, be used directly as a switch or reversing switch for an electric circuit which is to be remotely controlled. In such a case, the connections are made on the one hand to the shaft 12 and on the other hand to the stops 13, 14. The control lever must then be made from electrically conductive material and insulated from the other electrically conductive components of the thermal regulator, such as the spring 9. It is also possible to make the control lever 11 in the form of an operating member for a small electric switch controlled through the extension 15.

The invention in its broader aspects is not limited to the instrumentalities and combinations described, but departure may be made therefrom within the scope of the accompanying claims without departing from the principles of the invention and without sacrificing its chief advantages.

What is claimed is:

1. Thermal control apparatus comprising an insulator pivotally mounted on a shaft, a bimetallic control carried on said insulator and which actuates the control operation with its free end, a heating element by which said bimetallic control is heated, said heating element being arranged on said bimetallic control, a frame for the apparatus and a room-temperature compensator, one end of which is carried by said insulator and the other end of which is in movable engagement with said frame, said compensator comprising a plurality of bimetallic compensating members and said insulator interconnecting said control and said compensator and to provide thermal insulation therebetween.

2. Apparatus, according to claim 1, characterized in that the heating element comprises a heating coil mounted on a coil-support, said support being made of insulating material which softens upon heating.

3. Apparatus, according to claim 2, characterized in that the coil-support comprises a roll of insulating paper made from asbestos fibers saturated with silicon lacquer.

4. Apparatus according to claim 2, characterized in that thin electrical conductor strips are arranged within the coil-support on the same side as the heating coil for the purpose of supplying current to the latter.

5. Apparatus according to claim 4, characterized in that recesses are provided in the coil-support into which the strips project and these have several turns of the terminals of the heating coil wound thereon, which turns are in contact with the strips by means of a U-shaped clip engaging and surrounding the turns and the strips.

6. Apparatus according to claim 1, characterized in that the heating element is provided with external insulation made from asbestos fibres saturated with silicon lacquer.

7. Thermal control apparatus comprising a frame, a bimetallic control having a free end which actuates the control operation, a heating element by which said bimetallic control is heated, said heating element being arranged on said bimetallic control, a room-temperature compensator, one end of which is guided for limited movement in said frame, said compensator comprising a plurality of bimetallic compensating members, said members upon equal heating or cooling each flexing to the same amount and in the same direction as the bimetallic control and having a total flexing resistance which is greater than that of the bimetallic control and means for interconnecting said bimetallic control and said compensator and for providing thermal insulation therebetween comprising an insulator structure pivoted with respect to said frame and connected to the other ends of said control and said compensator.

8. Apparatus according to claim 2, characterized in that thin conductor strips are arranged within the coil-support and inserted on the same side of it for the purpose of supplying current to the heater coil.

9. Apparatus for providing thermally actuated control functions in response to electrical signals comprising an apparatus frame, a bimetallic control having a free end which actuates said control functions, an ambient temperature compensator having one end in movable engagement with said frame and comprising a plurality of bimetallic compensating members, means for interconnecting said bimetallic control and said compensator and for providing thermal insulation therebetween comprising an insulation structure pivoted with respect to said frame and to which the respective other ends of said bimetallic control and said compensator are connected, means for energizing said bimetallic control to initiate said control functions comprising a heating element arranged on said bimetallic control and adapted to be controlled by said electrical signals.

10. Apparatus according to claim 9, in which said heating element is mounted on said bimetallic control and includes a coil and a support therefor, said support being made of insulating material which softens upon heating.

11. Apparatus according to claim 9, in which said bimetallic compensating members are juxtaposed in laminar fashion to form said ambient temperature compensator.

References Cited in the file of this patent

UNITED STATES PATENTS

| | | |
|---|---|---|
| 2,353,350 | Millerwise | July 11, 1944 |
| 2,503,457 | Speir et al. | Apr. 11, 1950 |
| 2,850,870 | Martin | Sept. 9, 1958 |
| 2,889,439 | Musgrave | June 2, 1959 |

FOREIGN PATENTS

| | | |
|---|---|---|
| 33,729 | France | July 31, 1928 |